United States Patent
Heidenreich

(10) Patent No.: US 9,504,958 B2
(45) Date of Patent: Nov. 29, 2016

(54) CATALYTIC FILTER MODULE AND CATALYTIC FILTER SYSTEM COMPRISING SAME

(71) Applicant: Pall Corporation, Port Washington, NY (US)

(72) Inventor: Steffen Heidenreich, Stimpfach (DE)

(73) Assignee: Pall Corporation, Port Washington, NY (US)

( * ) Notice: Subject to any disclaimer, the term of this patent is extended or adjusted under 35 U.S.C. 154(b) by 623 days.

(21) Appl. No.: 13/959,858

(22) Filed: Aug. 6, 2013

(65) Prior Publication Data

US 2014/0050626 A1 Feb. 20, 2014

(30) Foreign Application Priority Data

Aug. 17, 2012 (EP) ..................................... 12180891

(51) Int. Cl.
*B01D 50/00* (2006.01)
*B01D 53/88* (2006.01)
(Continued)

(52) U.S. Cl.
CPC ......... *B01D 53/565* (2013.01); *B01D 53/8631* (2013.01); *B01D 53/885* (2013.01);
(Continued)

(58) Field of Classification Search
CPC .......... B01D 46/0023; B01D 46/2418; B01D 46/2429; B01D 46/247; B01D 46/2407; B01D 46/2411; B01D 46/2422; B01D 53/565; B01D 53/885; B01D 53/8631; F23J 15/025
USPC ....... 422/168, 169, 171, 217; 55/342, 350.1; 110/216, 217
See application file for complete search history.

(56) References Cited

U.S. PATENT DOCUMENTS

| | | | | |
|---|---|---|---|---|
| 4,427,423 A | * | 1/1984 | Montierth | ............ B01D 46/002 422/171 |
| 5,318,755 A | | 6/1994 | Kuivalainen et al. | |

(Continued)

FOREIGN PATENT DOCUMENTS

| | | |
|---|---|---|
| DE | 10 2007 063 100 A1 | 7/2009 |
| EP | 0 600 440 A2 | 6/1994 |

(Continued)

OTHER PUBLICATIONS

Notice of Reasons for Rejection, Japanese Application No. P2013-160541 dated Nov. 11, 2014.

(Continued)

*Primary Examiner* — Jill Warden
*Assistant Examiner* — Joye L Woodard
(74) *Attorney, Agent, or Firm* — Jeremy Jay

(57) ABSTRACT

A catalytic filter module for gaseous fluids is disclosed comprising a block-shaped filter element, a catalytic element and a clean gas collecting and discharge arrangement. The catalytic element is substantially coextensive with the filter element, said filter element has a feed face and on its opposite side a discharge face from which filtrate exits to be received by the upstream face of the catalytic element. The gaseous fluid exits the catalytic element as clean gas at a clean gas face thereof opposite to the upstream face. The clean gas collecting and discharge arrangement comprises one or more channels extending across the whole clean gas face of the catalytic element deflecting and directing the clean gas flow transverse to the vertical of the clean gas face of the catalytic element to a clean gas discharge opening of the filter module at a side face thereof.

25 Claims, 8 Drawing Sheets

(51) Int. Cl.
*B01D 53/56* (2006.01)
*B01D 53/86* (2006.01)
*F23J 15/02* (2006.01)
B01D 46/24 (2006.01)
B01D 46/00 (2006.01)

(52) U.S. Cl.
CPC ......... *F23J 15/025* (2013.01); *B01D 46/0023* (2013.01); *B01D 46/247* (2013.01); *B01D 46/2418* (2013.01); *B01D 46/2429* (2013.01); *F23J 2215/10* (2013.01); *F23J 2217/101* (2013.01); *F23J 2217/104* (2013.01); *F23J 2217/105* (2013.01); *F23J 2219/10* (2013.01)

(56) References Cited

U.S. PATENT DOCUMENTS

| | | |
|---|---|---|
| 5,482,537 A | 1/1996 | Eriksson |
| 5,536,285 A | 7/1996 | Isaksson et al. |
| 5,809,645 A | 9/1998 | Thomsen et al. |
| 6,837,911 B2 | 1/2005 | Noda et al. |
| 6,863,868 B1 | 3/2005 | Alvin |
| 7,300,483 B2 | 11/2007 | Hauville |
| 2003/0091481 A1 | 5/2003 | Dang et al. |
| 2006/0188422 A1* | 8/2006 | Mayer ............ F01N 3/0211 422/168 |
| 2014/0047806 A1 | 2/2014 | Heidenreich |

FOREIGN PATENT DOCUMENTS

| | | |
|---|---|---|
| EP | 1 450 015 A1 | 8/2004 |
| EP | 2 364 764 A1 | 9/2011 |
| JP | 63065926 A | 3/1988 |
| JP | 07-000764 A2 | 1/1995 |
| JP | 1995-000764 A | 1/1995 |
| JP | 11-057360 A2 | 3/1999 |
| JP | 2000-117022 A2 | 4/2000 |
| JP | 2005-238231 A2 | 9/2005 |

OTHER PUBLICATIONS

Extended European Search Report, Appln. No. 12180891.9-2113, mailed on Sep. 11, 2012.

* cited by examiner

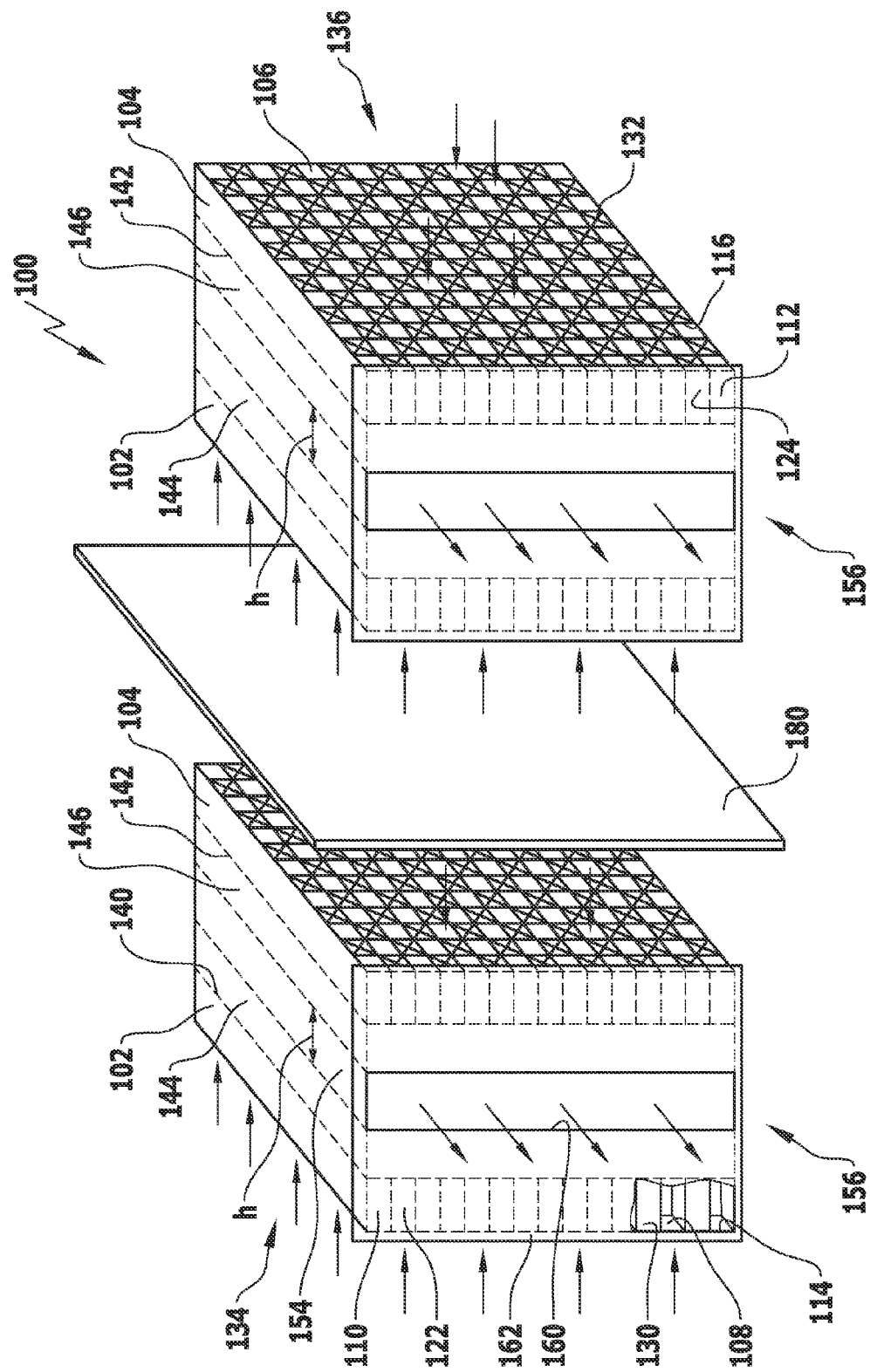

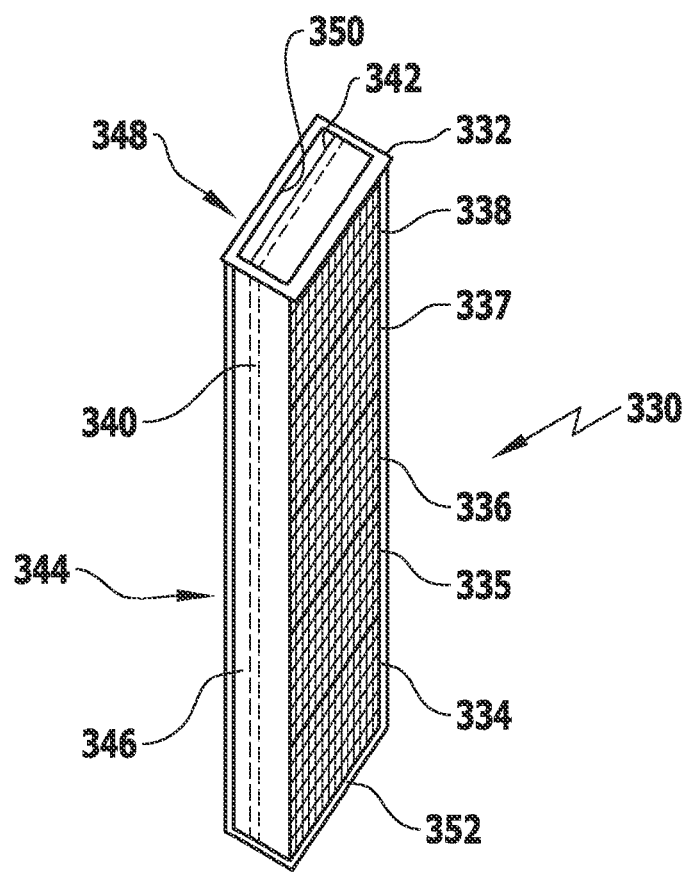
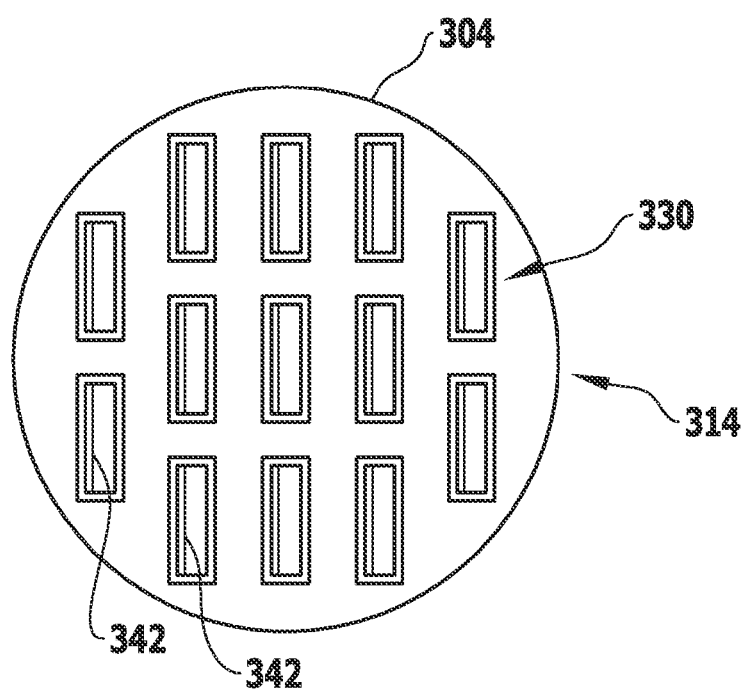

CATALYTIC FILTER MODULE AND CATALYTIC FILTER SYSTEM COMPRISING SAME

CROSS-REFERENCE TO RELATED APPLICATIONS

This patent application claims the benefit of European Patent Application No. 12 180 891.9, filed Aug. 17, 2012, which is incorporated by reference.

FIELD OF THE INVENTION

The invention relates to a catalytic filter module and a catalytic filter system comprising the same. Catalytic filter modules and catalytic filter systems of the present invention are often used for a combined particle removal and catalytic removal of gaseous components in gaseous fluids. One example for such an application is a combined removal of particles and nitrogen oxides from flue or exhaust gases.

BACKGROUND OF THE INVENTION

A filter system for cleaning flue gas is known from U.S. Pat. No. 5,318,755 A wherein a barrier filter element of a honey-comb structure is accommodated in a housing together with a separate catalyst element. The raw gas is first passed through the barrier filter element into a clean gas space and then passed from the clean gas space through the catalyst element which likewise is of a honey-comb structure. The catalyst element is substantially coextensive with the filter element. Clean gas is subsequently discharged from the housing in a direction substantially parallel to the flow direction within the filter element and the catalytic element.

Catalytic filter modules in the form of cylindrical filter candles and a filtration system comprising same within a filter vessel has been proposed in the U.S. Pat. No. 6,863,868 B1 for hot gas filtration. The filter candles have a unitary porous body of sintered particles, said particles being coated with a catalytic layer on their surfaces. The upstream or feed surface of the filter candles is covered by a porous membrane retaining fines. Clean gas accumulates within the filter candles and is withdrawn therefrom into a common clean gas space from where it is discharged from the vessel of the system.

The prior art catalytic filter modules in the form of cylindrical unitary filter candles are typically made of ceramic materials. Conventional catalytic ceramic filter candles have a length of typically 2 or sometimes even 3 m which, because of the mechanical properties of the sintered ceramic material and the mechanical stress during operation of the filter systems cannot be further increased. Therefore, the filter area of the individual candles is limited, and for treating higher volume flow rates thousands or ten thousands of filter candles are necessary. Very big filter vessels or several vessels to be operated in parallel are needed in order to accommodate such a large number of catalytic filter candles.

However, the volume flow rates in hot gas filtration applications may range up to about 1 million m³/h or more which are too high for the use of such conventional catalytic ceramic filter candles.

BRIEF SUMMARY OF THE INVENTION

The object of the present invention is to provide a filter module which may be incorporated with a high packing density in a filter system.

This problem is solved by a filter module according to claim 1.

The inventive catalytic filter modules provide a high filter area per volume and may be easily packed with high densities in a filter system. Therefore, the inventive catalytic filter modules provide a solution for very high volume flow rates while the filter vessel accommodating the modules still has an economically reasonable size.

The catalytic filter modules and systems comprising same may be advantageously used in classical hot gas filtrations. Further fields of application are biomass gasification, exhaust gas cleaning of sinter plants and coke oven plants, exhaust gas cleaning of power plants and incinerators, refinery processes like in FCC (fluid catalytic cracking) units or in chemical processes, in the cement industry etc.

BRIEF DESCRIPTION OF THE SEVERAL VIEWS OF THE DRAWING(S)

FIG. 3 shows a catalytic module according to a third embodiment of the present invention;

FIGS. 5A to 5C show, in a schematic representation, a second embodiment of a catalytic filter system incorporating catalytic filter modules according to the present invention, and details thereof.

DETAILED DESCRIPTION OF THE INVENTION

Figure 1A:
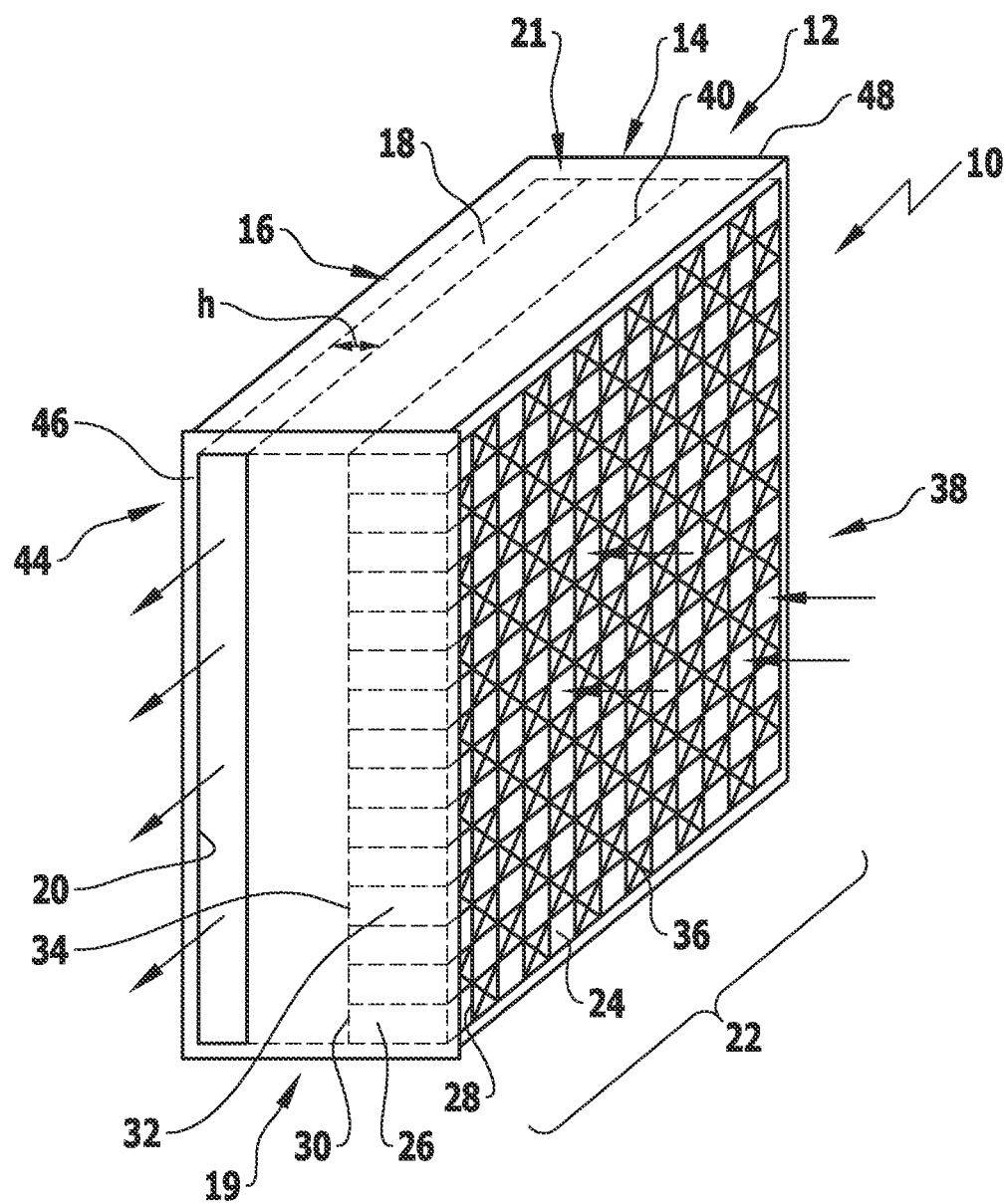
FIG. 1A shows a catalytic filter module according to a first embodiment of the present invention.

The inventive catalytic filter modules comprise a block-shaped filter element, a catalytic element and a clean gas collecting and discharge arrangement.

The filter element and the catalytic element are substantially co-extensive with one another. The filter element receives the feed gas (e.g., flue or hot gas) at its upstream or feed face. On the opposite surface of the block-shaped body of the filter element (in the following the filtrate side or discharge face) filtrate exits to be received by the upstream face of the catalytic element.

The catalytic element may be arranged at the filtrate side of the filter element with a small gap in between the filter element and the catalytic element. In other preferred embodiments the catalytic element is positioned in direct contact with the filter element and directly receives the filtrate for catalytic treatment of gaseous components still comprised within the filtrate gas.

Clean gas exits the catalytic element at its clean gas face. The flow direction of the gas when passing through the filter element and the catalytic element is substantially uniform and linear.

The clean gas collecting and discharge arrangement extends substantially across the whole clean gas face of the catalytic element and receives the clean gas flow therefrom. The clean gas collecting and discharge arrangement deflects and directs the clean gas flow transverse to the vertical of the clean gas face of the catalytic element. The clean gas exits the inventive module through an opening at a side face thereof.

Because of such design, the filter element, the catalytic element and the clean gas collecting and discharge arrangement can be provided in a very compact structure and mounted in a high number per volume within a housing or a vessel of a catalytic filter system.

The filter element of the inventive catalytic filter module may be selected from different designs according to the challenges of a specific filtration application.

Typical designs include membranes, films, sheets, discs and honeycomb structured elements.

Preferably, the filter elements are made of sintered ceramic, metal or plastic material.

The filter element may be designed as a unitary structure or a plurality of subunits attached to one another by gluing, welding or sintering or by accommodating the subunits in a common frame.

Filter elements of a honey-comb structure are preferred when a high filtration area is needed. Honey-comb structured filter elements typically have a plurality of raw gas ducts and filtrate ducts arranged coextensive and in parallel, the raw gas ducts being open at the raw gas side or feed face of the filter element and closed at the filtrate side or discharge face thereof. The filtrate ducts are closed at the raw gas side of the filter element and open at the filtrate side. The raw gas ducts and the filtrate ducts are separated from one another by porous tubular wall parts.

The preferable axial length of the tubular wall parts of the filter elements ranges from about 10 mm to about 300 mm, more preferably from about 30 mm to about 200 mm, most preferably from about 50 mm to about 150 mm. The preferable axial length of the tubular wall parts allows an efficient discharge of particulate matter from the filter elements during back-pulsing even when the longitudinal axis of the filter elements is in a horizontal orientation.

The number of filter elements per 10 cm$^2$ cross-section of the feed side of a unit preferably ranges from about 1 to about 100, more preferably from 2 to about 10. Typically, the same number of clean gas ducts is provided per 10 cm$^2$ cross-sectional area.

The tubular wall parts have cross-sectional areas corresponding to the area of a square with an edge length of about 3 mm to about 20 mm, preferable of about 5 mm to about 10 mm. Corresponding cross-sectional areas are also preferable for filter elements designed with other rectangular, oval or circular cross-sections.

The average porosity of the tubular wall parts and optionally of the closed ends of the raw gas ducts and/or the clean gas ducts is in the range of about 25 to about 90% by volume.

In order to allow regeneration of the filter element while it is accommodated in the filter vessel of a filter system gas back pulses are applied which detach and remove the particulate matter collected within the raw gas ducts during filtration operation.

The inventive catalytic filter modules are typically accommodated in the housing of a catalytic filter system with the raw gas sides of the filter elements oriented vertically.

An orientation of the raw gas ducts of the filter elements perpendicular to the raw gas side thereof already allows an effective back pulsing and removal of the particulate matter from the raw gas ducts. The efficiency of particulate removal from the raw gas ducts during back-pulsing may be further improved by orienting the raw gas ducts (and likewise the filtrate ducts) in a slanted orientation. The angle between the longitudinal axis of the raw gas ducts and the vertical of the feed face is preferably in the range from about 10° to about 60°, preferably from about 30° to about 60°, the lowermost part of the raw gas ducts being their open ends.

The preferred pore size of the filter elements ranges from about 0.1 μm to about 150 μm, more preferably from about 1 μm to about 100 μm, most preferably form about 2 μm to about 10 μm. In some embodiments the filter elements are designed for fine-filtering and are able to retain particles of a size down to less than about 1 μm, e.g., about 0.5 μm.

The catalytic element according to a first preferred embodiment of the present invention has a compartment which accommodates catalytic particulate matter in the form of a fluidized bed or a fixed bed.

Fluidized bed or fixed bed catalyst particles preferably have an average particle size of from about 10 μm to about 30 mm, more preferably from about 100 μm to about 10 mm.

In a second preferred embodiment the catalytic element comprises a body made of sintered grains and/or a fibrous material or a foam material. The catalytic element may be made of ceramic or metal materials. In some cases the ceramic or metal material may have a catalytic activity per se sufficient for a specific application or incorporate a catalyst, optionally a catalyst may be applied to the body of the catalytic element, e.g., by impregnating or coating the body of the catalytic element.

Generally speaking, the catalytic element may be of quite diverse structures, e.g., a honeycomb structure, a cassette type, disc- or plate-shaped, or in the form of a fiber mat. The catalytic element may have a unitary structure or be composed of several sub-units.

The body of the catalytic element preferably has a honeycomb structure. The honeycomb structure may have a similar design as the honeycomb structure explained in connection with the detailed description of the filter element. However, typically the ducts of the honeycomb structure of a catalytic element are open at both ends thereof in contrast to the ducts of a filter element which have one end closed.

The advantage of this second preferred embodiment over the first preferred embodiment is that such catalytic element may be designed with a lower delta p and a more homogeneous distribution of the catalytically active components.

The lower pressure drop across the catalytic element provides for more effective back-pulsing during regeneration of the filter modules.

Preferably, the pore size of the catalytic element is made larger than the pore size of the filter element. Therefore, the catalytic element does not contribute noticeable to the filter effect of the filter module, i.e., it is more or less not actively involved in separating particulate matter from the feed gas.

An average pore size of a preferred catalytic element ranges from about 10 to about 500 μm, more preferably from about 50 to about 200 μm.

Preferred catalytic elements made of ceramic foam may be characterized by a pore density of about 10 to about 60 ppi (pores per inch), more preferably of about 30 to 45 ppi. The ceramic foam is preferably made of sintered particles with an average particle size of from about 0.1 to about 100 μm, more preferably of about 0.3 to about 30 μm.

Catalytic elements in the form of porous bodies made of ceramic fibers are preferred where the fibers have an average fiber diameter of about 1 to 50 μm, more preferably about 2 to 10 μm. The preferable fiber length is in the range of from about 1 to about 20 mm.

The catalytic elements used in the catalytic filter modules of the present invention may be provided at their upstream surface with a safety filter layer. The catalytic elements then in addition have the function of a safety fuse.

The catalytic filter module may be designed with different and also combined catalytic activities in order to make them comply with the requirements of a specific application. Typical catalytic activities are, e.g., redox reactions, NO reduction or tar removal.

Depending on the application the filter module of the present invention may be equipped with a second catalytic element providing for a catalytic activity different from the catalytic activity of the first catalytic element.

The clean gas collecting and discharge arrangement may be designed with one or more parallel channels. Preferably a channel of the has a height, measured as the clearance in the direction of the vertical of the clean gas face of the catalytic element, in the range of from about 0.1 to about 0.7 times, preferably about 0.3 to about 0.5 times the distance of the feed face of the filter element from the clean gas face of the catalytic element.

In accordance with still another aspect of the present invention the filter module may comprise a first set of a block-shaped filter element and a catalytic element and a second set of a block-shaped filter element and a catalytic element, the first and second sets being arranged spaced apart from one another and the clean gas faces of the respective catalytic elements oriented back-to-back, said clean gas collecting and discharge arrangement being positioned in between the first and second sets receiving clean gas from the clean gas faces of the catalytic elements of the first and second sets and serves both sets. Preferably, the one or more channels of the clean gas collecting and discharge arrangement have a height, measured as the clearance in the direction of the vertical of the clean gas faces of the sets, in the range of from about 0.2 to about 1.4 times, more preferably about 0.6 to about 1 times the distance of the feed face of the filter element from the clean gas face of the catalytic element of one set.

According to still another aspect of the present invention the channel of the clean gas collecting and discharge arrangement is oriented with its longitudinal direction in an angle of about 30° or more, preferably of about 60° or more, more preferably of about 90° to the clean gas face of the catalytic element of the filter module.

This angle of deflection is defined in a preferred embodiment by the orientation of a wall or walls of the channel(s) of the clean gas collecting and discharge arrangement extending across the discharge side of the block-shaped unit(s) of the filter module.

Preferably, the sets of filter elements and catalytic elements in a back-to-back arrangement are provided with their discharge faces in a parallel orientation. The angle of deflection of the clean gas exiting the clean gas ducts is then about 90°.

However, the block-shaped units in a back-to-back arrangement may have their discharge side surfaces arranged diverting from the parallel orientation. However, the deflecting angle for the clean gas exiting the clean gas ducts is preferably about 30° or more, more preferably about 60° or more.

Preferred inventive catalytic filter modules are designed as a catalytic filter candle of rectangular cross-section which may be positioned in a vessel of a filter system depending from a tube sheet similar to the conventional cylindrical filter candles.

The filter module may be made of a filter element comprising several sub-units assembled by gluing, sintering or welding the sub-units together or by accommodating the sub-units in a common frame. The catalytic element may consist of a unitary element serving for all sub-units of the filter element or of several sub-units, e.g., one sub-unit of the catalytic element serving for four sub-units of the filter element or the sub-units of the catalytic element corresponding in number to the number of sub-units constituting the filter element.

The filter modules of the present invention may furthermore include a framing at the side faces thereof, facilitating the mounting of the filter modules in a housing.

The invention, furthermore, refers to a catalytic filter system which incorporates one or more catalytic filter modules in a housing as explained above.

Said housing comprises an interior space separated into a raw gas and a clean gas chamber. The filter module(s) are arranged within said interior space, the feed face(s) of the filter element(s) oriented substantially vertical and in fluid communication with the raw gas chamber. The clean gas discharge opening(s) of the filter module(s) are in fluid communication with the clean gas chamber of the housing. Optionally, the system comprises a back-pulse arrangement.

Preferably, the housing comprises a tube sheet separating the interior of the housing into the raw gas and the clean gas chamber, said tube sheet comprising openings accommodating the one or more filter modules, preferably in parallel orientation to one another.

According to a preferred embodiment of the system, the filter modules are accommodated in the housing with a parallel orientation of the feed sides, optionally the feed side of one filter module facing the clean gas side of an adjacent module, the filter modules being preferably arranged in a staggered configuration.

According to a further preferred embodiment of the system, the filter modules are accommodated in the housing with a parallel orientation of their feed sides, the feed sides of one module facing the feed side of an adjacent module, preferably the system further includes partition plates positioned in between two adjacent filter modules.

According to still another preferred embodiment of the system, two or more filter modules are mounted in a common rack and preferably having their clean gas collecting and discharge arrangements fluidly connected to one another. Preferably the system comprises a clean gas discharge channel into which the discharge ends of the clean gas collecting and discharge arrangements substantially directly feed the clean gas via the clean gas openings of the filter modules.

FIG. 1A shows a catalytic filter module 10 according to the present invention including a catalytic filter element 12 in a block-shaped design, a catalytic element 14 and a clean gas collecting and discharge arrangement 16.

The block-shaped filter element 12 and the catalytic element 14 are designed substantially co-extensive with one another and are arranged side by side, preferably in direct contact with one another, so as to feed the filtrate exiting the filter element 12 directly into the catalytic element 14.

On the clean gas side of the catalytic element 14 the clean gas collecting and discharge arrangement 16 is provided in a structure substantially coextensive with the clean gas or downstream side of the catalytic element 14.

The clean gas collecting and discharge arrangement 16 includes a box-shaped channel 18 which opens at the front side 19 of the filter module 10 with an opening 20, e.g., to a clean gas chamber of a catalytic filter system (not shown in FIG. 1A).

The filter element 12 may have various designs and will be selected according to the particle load and to the nature of the particles to be removed from a raw gas.

In the following description the invention is explained in connection with a preferred and specific filter element 12 with a so-called honeycomb structure, but of course the invention is not limited to such specific type of filter element.

The filter element 12 of the catalytic filter module 10 essentially consists of one unit 22 comprising a plurality of raw gas ducts 24 having a longitudinal, porous tubular wall part 26 with an open end 28 and a closed second end 30.

The tubular wall parts 26 have a square cross-section and are arranged in a checkerboard pattern together with a plurality of filtrate ducts 32 which are substantially coextensive with, oriented parallel to and regularly interposed between the raw gas ducts 24. The filtrate ducts 32 are open at one end 34 and closed at the other end 36 thereof. The open ends 28 of the raw gas ducts 24 and the closed ends 36 of the filtrate ducts 32 form a first checkerboard pattern on the upstream or feed face 38 of the filter element 12. A checkerboard pattern of closed ends 30 of the raw gas ducts 24 and the open ends 34 of the filtrate ducts 32 is provided on the opposite side or discharge face 40 of the unit 22. The tubular wall parts 26 of the raw gas ducts 24 are of a porous material, e.g., sintered ceramic material, sintered metallic material or a sintered polymer material with a certain pore size. The wall parts 26 at the same time delimit the filtrate ducts 32 along their longitudinal direction.

Raw gas entering the feed face 38 of the filter element 12 flows into the open ends 28 of the raw gas ducts 24, penetrates their tubular wall parts 26, and filtrate gas is received in the filtrate ducts 32 from where it is discharged to the discharge face 40 of the filter element 12.

At the discharge face 40 of the unit 22, the catalytic element 14 extends all across said surface of the filter element 12. The catalytic element 14 may be described exemplarily as an element having catalytic DeNOx activity.

The catalytic element 14 comprises a support body of a ceramic foam of, e.g., alumina or silicon carbide, with a pore density of about 30 ppi. The support body is catalytically activated with a selective catalytic reduction (SCR) catalyst of the composition $TiO_2$, $V_2O_5$, $WO_3$.

A clean gas collecting and discharge arrangement 16 is provided which is closed on the back side and at three lateral faces and open only at the front lateral face 44 shown in FIG. 1. The clean gas exits the filter module 10 through that opening 20.

To facilitate mounting of the filter module 10 in a housing or vessel of a filter system, the filter module 10 comprises on its front side face 44 an outwardly projecting flange 46.

The lateral surfaces of the filter module 10 are preferably covered by a metal frame structure 48 which may incorporate the clean gas collecting and discharge arrangement 16. On one of the lateral surfaces of the frame structure 48 (front side face 44 in FIG. 1A), the flange 46 may be provided as well as the opening 20.

According to the present invention, preferably the length of the raw gas ducts 24 is limited to about 300 mm or less, which surprisingly allows very easy cleaning by back-pulsing of the filter module and its filter element from particulate matter collected during filtering operation on the tubular wall parts 26 even if they have the horizontal orientation shown in FIG. 1A.

The feed side of the unit 22 may have a size of, e.g., 250×250 $mm^2$. This is a typical size when the unit 22 is made of a ceramic material using an extrusion process to produce the duct structure of unit 22. Other manufacturing processes may allow larger sizes of the unit 22. The length of the raw gas ducts and filtrate ducts may be about 300 mm as mentioned before.

Typically, catalytic filter modules are desired which have a substantial larger size. This need can easily be met by a multi-unit structure where multiple units 22 are attached to one another side by side to provide larger surface areas on the upstream feed side of a module, e.g., surface areas of 1500×1000 $mm^2$ or 4000×250 $mm^2$. In case of the first example a matrix of 6×4 units 22 is necessary, in the second example the need is met with a unit-matrix of 16×1.

Attachment of the units may be accomplished by sintering, welding or gluing the units with their side faces together. Alternatively, the multiple units may be mounted in a common frame, their side faces being sealed against one another.

The catalytic elements may likewise comprise more than one unit and be attached or mounted as a unitary structure by the methods mentioned in connection with the filter element.

In filter modules with a multi-unit arrangement the clean gas collecting and discharge arrangement is designed with one or more channels, each channel receiving clean gas from more than one unit.

Figure 1B:
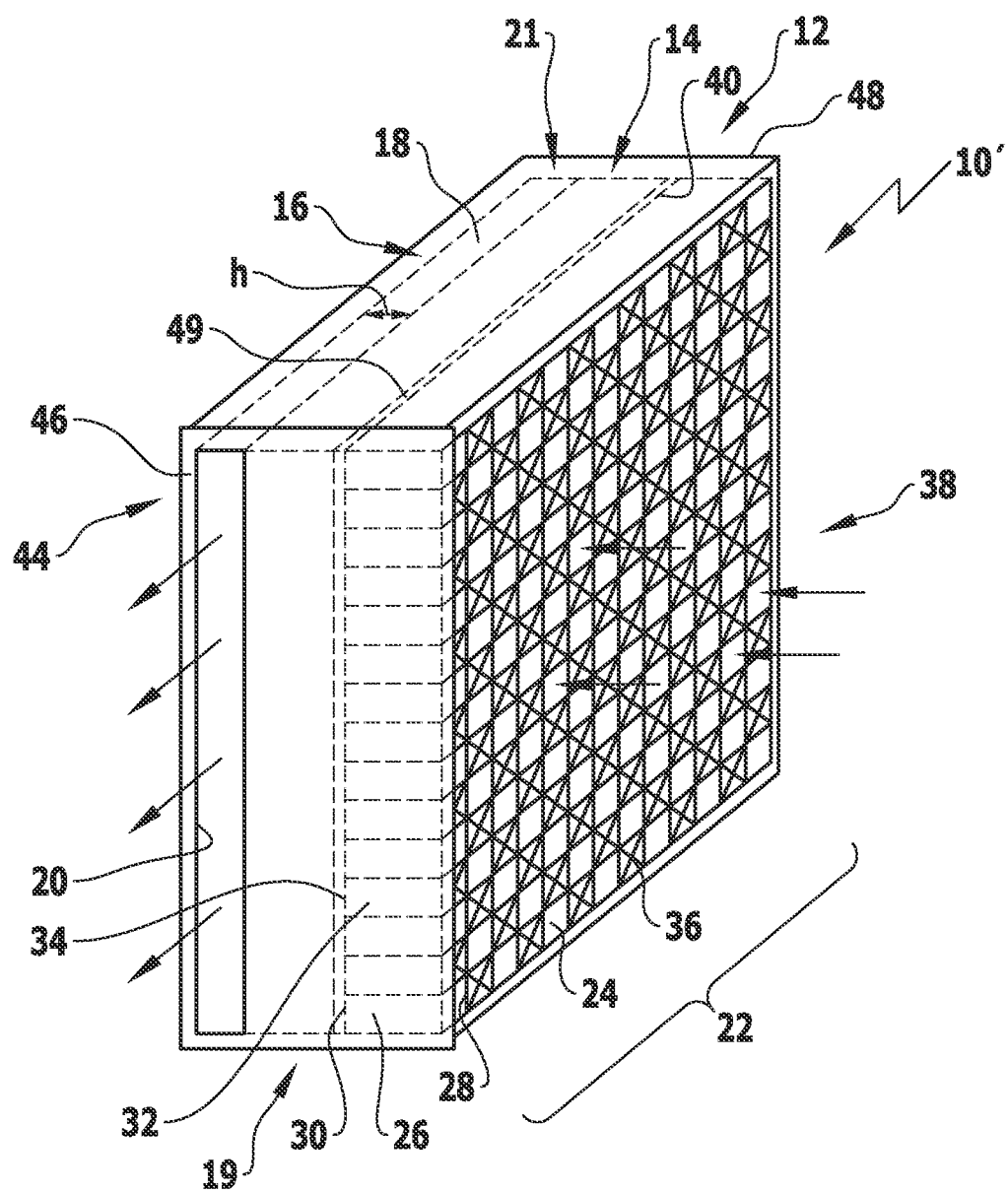
FIG. 1B shows the catalytic filter module of FIG. 1A equipped with a safety fuse function.

FIG. 1B shows a filter module 10' which is a modification of the filter module 10 of FIG. 1A. Therefore, like parts are designated with the same reference numerals as used in the description of FIG. 1A. In addition to the components described already with reference to FIG. 1A the filter module 10' includes a safety fuse 49 in the form of a disc-shaped element covering the outlets of the filtrate ducts 32. The safety fuse 49 is substantially co-extensive with the discharge face of filter element 12. In case of failure of one or more of the raw gas ducts 24, e.g., their tubular wall parts, raw gas penetrating unfiltered into the filtrate ducts 32 cannot reach the catalytic element 14 without prior passing through the safety fuse 49. The safety fuse 49 can be provided on the upstream face of the catalytic element 14.

The distance of the closed back wall of the channel 18 to the clean gas face of the catalytic element (clearance h) preferably amounts to about 0.3 to about 0.5 times the distance of the feed face of the filter element from the clean gas face.

The filtrate is received by the catalytic element 14 through which it penetrates to the clean gas collecting and discharge arrangement 16. The clean gas flow is then deflected by about 90° and directed parallel to the clean gas face of the catalytic element 14.

Figure 2:
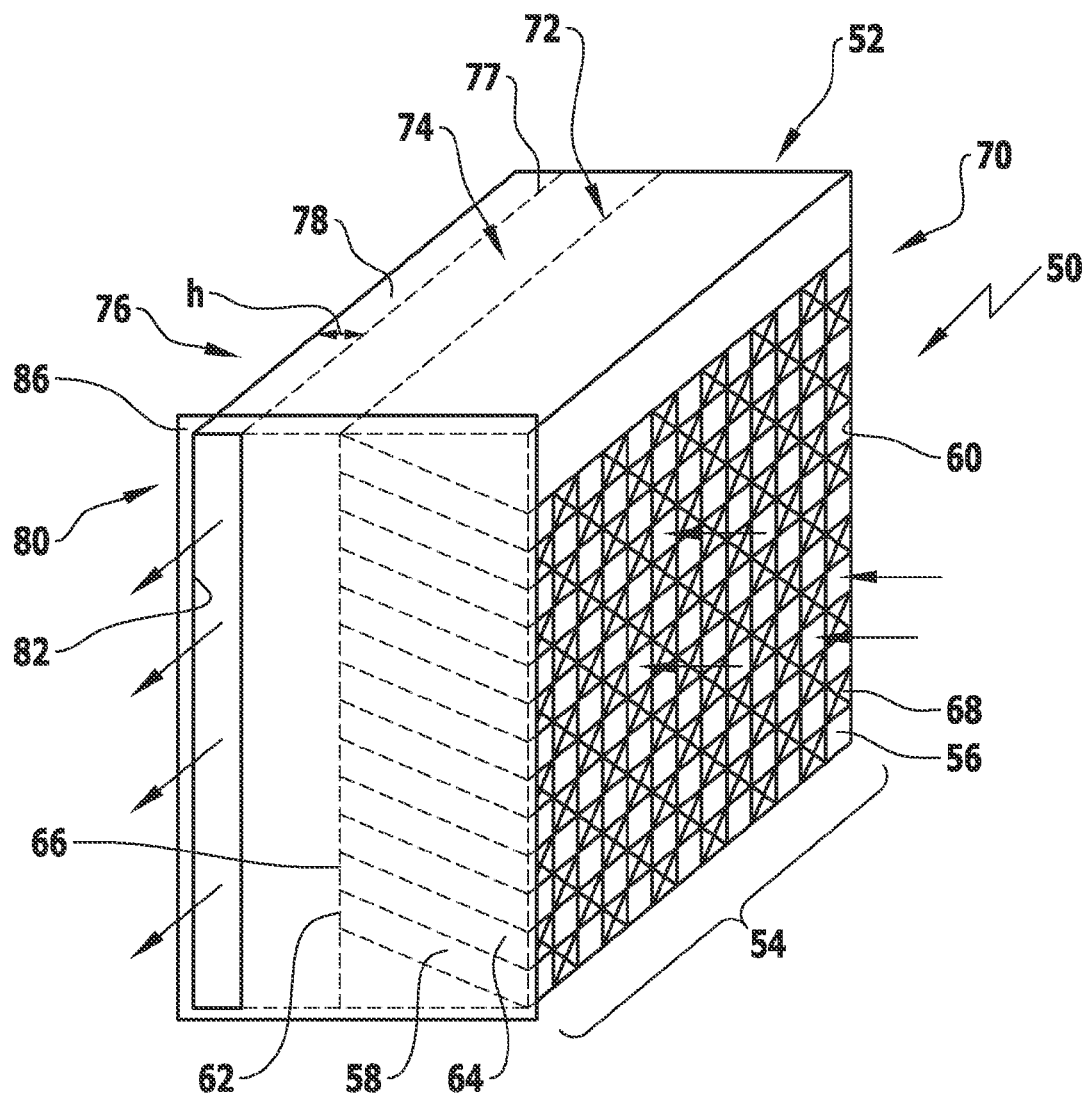
FIG. 2 shows a catalytic filter module according to a second embodiment of the present invention.

FIG. 2 shows a second embodiment of a catalytic filter module 50 according to the present invention.

The filter module 50 comprises a block-shaped filter element 52 in the form of one unit 54 comprising a plurality of raw gas ducts 56 having a longitudinal, porous tubular wall part 58 with open ends 60 and a closed second ends 62.

The tubular wall parts 58 have a square cross-section and are arranged in a checkerboard pattern together with a plurality of filtrate ducts 64 which are substantially coextensive with, oriented parallel to and regularly interposed between the raw gas ducts 56. The filtrate ducts 64 are open at one end 66 and closed at the other end 68 thereof. The open ends 60 of the raw gas ducts 56 and the closed ends 68 of the filtrate ducts 64 form a first checkerboard pattern on the upstream or feed face 70 of the filter element 52.

A checkerboard pattern of closed ends 62 of the raw gas ducts 56 and the open ends 66 of the filtrate ducts 64 is provided on the opposite or discharge face 72 of the unit 54. The tubular wall parts 58 of the raw gas ducts 56 are of a porous material, e.g., sintered ceramic material, sintered metallic material or a sintered polymer material with a certain pore size. The wall parts 58 at the same time delimit the filtrate ducts 64 along their longitudinal direction.

Raw gas entering the feed side of the catalytic filter module 50 flows into the open ends 60 of the raw gas ducts 56, penetrates their tubular wall parts 58, and filtrate is received in the filtrate ducts 64 from where it is discharged at the discharge side 72 of the unit 54.

On the discharge side 72 of the unit 54, a catalytic element 74 extends all across the surface of this side.

The catalytic element 74 may be designed like the catalytic element 14 shown in FIGS. 1A and 1B.

A clean gas collecting and discharge arrangement 76 is provided at the clean gas face 77 of the catalytic element 74. The clean gas collecting and discharge arrangement comprises a box-shaped channel 78 which is closed at the back and three lateral faces and only open at the lateral side face 80 as shown in FIG. 2.

The clean gas exits the filter module 50 through that opening 82. To facilitate mounting of the filter module 50 in a housing of a filter system, the filter module 50 comprises on its front lateral face an outwardly projecting flange 86.

In contrast to the catalytic filter module 10 of FIG. 1, the catalytic filter module 50 of FIG. 2 has the raw gas ducts 56 (and the filtrate ducts 64) arranged in an oblique orientation to the vertical of the feed face 70, the open ends of the raw gas ducts positioned lower than the closed ends thereof. The angle of the longitudinal axis of the raw gas ducts to the horizontal may range from about 30° to about 60°.

Upon back-pulsing, the interior space of the raw gas ducts 56 may be more easily cleaned from particulate matter which has accumulated during the filtration process because of the slanted configuration of the tubular walls 58 of the raw gas ducts 56.

Because of the slanted configuration of the raw gas ducts 56 within the unit 54, a somewhat lower filtration surface per volume ratio is obtained. This, however, is compensated by the improved back-pulse properties of filter module 50 which in the end allow longer cycle times of this type of module as compared to the filter module 10.

FIG. 3 shows a third embodiment of the present invention in the form of a filter module 100. The filter module 100 comprises two sets of filter elements and catalytic elements. The units 102, 104 of the two sets have a basic structure identical to the filter element 12 of filter module 10 of FIG. 1A.

The two units 102, 104 comprise a plurality of raw gas ducts 106, 108 having a longitudinal, porous tubular wall part 110, 112 with an open end 114, 116 and a closed second end. The tubular wall parts 110, 112 have a square cross-section and are arranged in a checkerboard pattern together with a plurality of filtrate ducts 122, 124 which are substantially coextensive with, oriented parallel to and regularly interposed between the raw gas ducts 106, 108.

The filtrate ducts 122, 124 are open at one end and closed at the other end 130, 132 thereof. The open ends 122, 124 of the raw gas ducts 106, 108 and the closed ends 130, 132 of the filtrate ducts 122, 124 form first checkerboard patterns on the upstream or feed sides 134, 136 of the filter modules 100.

A checkerboard pattern of closed ends of the raw gas ducts 106, 108 and the open ends of the filtrate ducts 122, 124 is provided on the opposite faces 140, 142 of the units 102, 104. These faces 140, 142 are the downstream or discharge faces of the units 102, 104. The tubular wall parts 110, 112 of the raw gas ducts 106, 108 are of a porous material, e.g., sintered ceramic material, sintered metallic material or a sintered polymer material with a certain pore size. The wall parts 110, 112 at the same time delimit the filtrate ducts 122, 124 along their longitudinal directions.

Raw gas entering the feed faces 134, 136 of the filter module 100 flows into the open ends 122, 124 of the raw gas ducts 106, 108, penetrates their tubular wall parts 110, 112, and filtrate is received in the filtrate ducts 122, 124 from where it exits at the discharge faces 140, 142 of the units 102, 104.

Catalytic elements 144, 146 may be designed as described in connection with the catalytic element 14 of the filter module 10 of FIG. 1A.

However, in contrast to the filter module 10 of FIG. 1A, the filter module 100 of FIG. 3 has the two sets of units 102, 104 and catalytic elements 144, 146 arranged in a back-to-back configuration such that the catalytic elements 144, 146 positioned at the closed ends of the raw gas ducts and the open ends of the filtrate ducts face each other.

Therefore, one common clean gas collecting and discharge arrangement 154 is sufficient to collect and discharge the clean gas provided by both sets of units 102, 104 and catalytic elements 144, 146. The clean gas from both catalytic elements 144, 146 when entering the clean gas collecting and discharge arrangement 156 is deflected by about 90° and directed transverse to the flow directions of the gas within the filter elements 102, 104 and catalytic elements 144, 146 of the filter module 100. The clean gas exits the catalytic filter module 100 through opening 160 to be discharged from a filtration system comprising these modules 100.

While the filter modules 10 and 50 of FIGS. 1A, 1B and 2 can easily be arranged in a configuration of multiple modules within one housing or vessel with the front faces 28, 68 are facing the back of the channel of the clean gas collecting and discharge arrangement 16, 76, the detached particulate matter from the filter elements upon back-pulsing may easily be discarded and removed from such a filtration system.

However, a precautionary measure has to be taken in an arrangement of multiple filter modules 100 in one housing or vessel as shown in FIG. 3.

Upon back-pulsing, in a system comprising the filter modules 100, a cross-contamination of two filter modules facing one another could occur, and therefore, it is preferable to have a partition plate 180 arranged in between the feed faces of the two adjacent filter modules 100 as shown in FIG. 3.

Figure 4A:
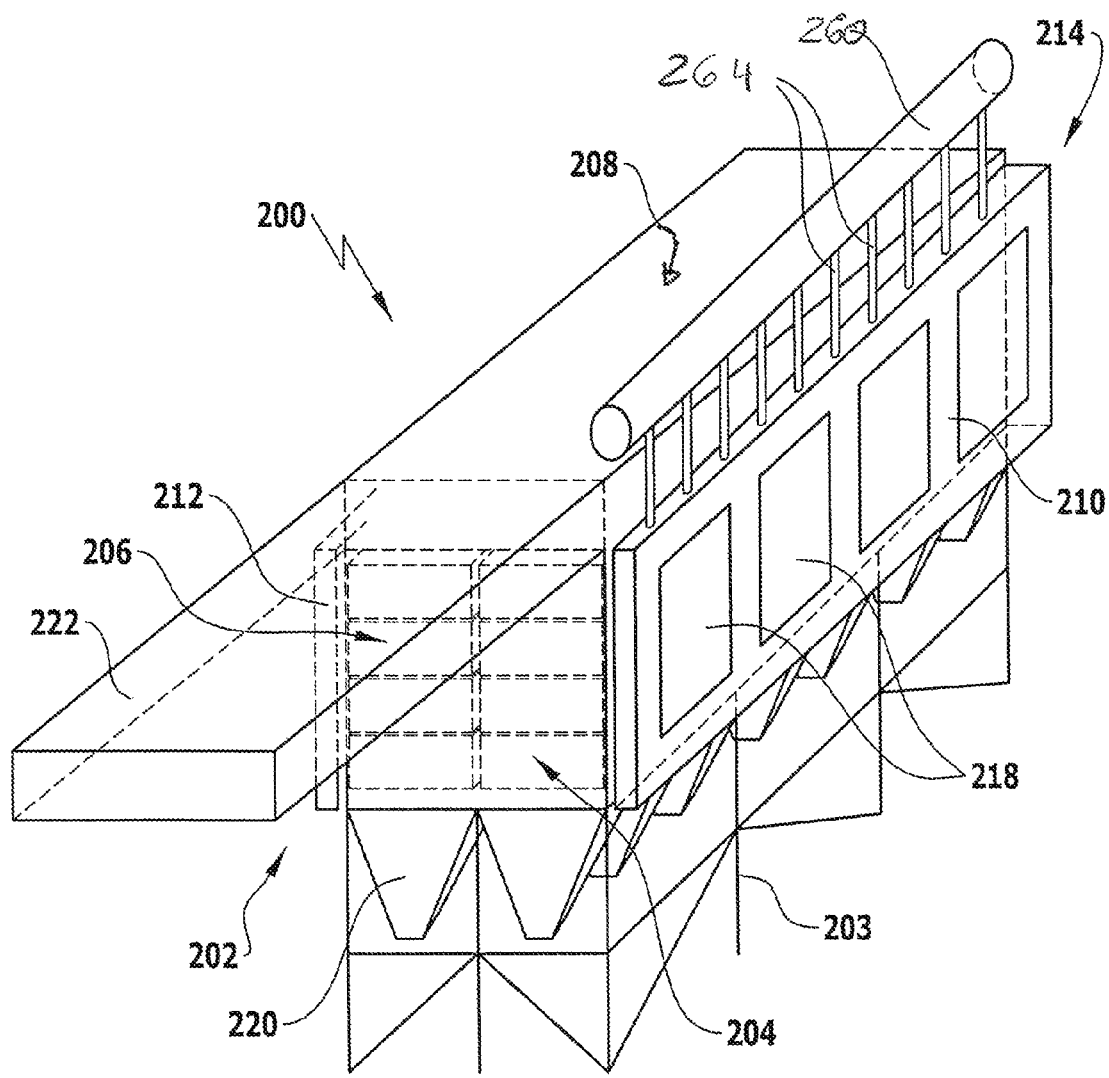
FIGS. 4A to 4C show in a schematic representation a first embodiment of a catalytic filter system incorporating catalytic filter modules according to the present invention and details thereof.

FIG. 4A shows a first embodiment of a catalytic filtration system 200 according to the present invention. The filter system 200 comprises a housing 202 which is of an elongated box-shaped configuration. The housing 202 is supported on a base frame 203.

Within the box-shaped housing 202, two rows of a plurality of catalytic filter module stacks 204, 204', 204", . . . and 206, 206', 206", . . . are arranged with the discharge openings of the filter modules of the two rows facing in opposite directions. Along the longitudinal axis of the box-shaped housing 202 the stacks are arranged in parallel at a certain distance from each other (cf. FIGS. 4B and 4C).

Within an individual stack 204, 206 of filter modules 204 *a, b, c, d* and 206*a, b, c, d*, respectively, the filter modules may be mutually fixed to one another by gluing, welding or sintering them together or by mounting them in a framing.

In an exemplary layout of the filter system 200 the feed side of a filter module 204*a*, 206*a* may have length 1500 mm and a height of 1000 mm, the depth of the filter module may be about 400 mm. Such filter module may comprise, for example, 24 block-shaped units the feed side surface of which may have the size of 250 mm×250 mm, the length of the tubular wall parts of the filter elements being about 140 mm.

The catalytic element at the discharge face of the filter element may be a plate-shaped body of a thickness of 200 mm in the fluid flow direction.

The clearance h of the clean gas collecting and discharge channel may amount to about 60 mm.

The distance between two adjacent stacks 204 and 204' or 206 and 206' of filter modules may be set, for example, to about 100 mm.

The housing comprises on its top surface a raw gas supply channel 208 which feeds raw gas into the housing 202 and its filter modules 204, 206. The raw gas supply channel 208 has a decreasing cross-sectional area from the front end shown in front of FIG. 4A to the dead end located at the rear end 214 of the system 200.

On both side faces in longitudinal direction, the housing 202 comprises clean gas passages 210, 212 which open at the rear end 214 of the system 200 where the clean gas may be discharged.

In order to accommodate the increasing amount of clean gas received from the multiple filter module stacks 204, 206 along the longitudinal axis of the housing 202, the cross-section of the clean gas passages 210, 212 increases gradually in the direction of the rear end 214 of the system 200.

The clean gas discharge channels 210, 212 can in accordance with one variant be removable as a whole when the filter module stacks 204, 206 have to be exchanged. Alternatively, as shown in FIG. 4A the clean gas discharge channels 210, 212 may be provided with number of doors 218 which allow access to the filter modules and exchanging same without complete removal of the clean gas discharge channels 210, 212.

The system 200 incorporates a back-pulsing facility receiving back-pulsing gas by a pipe 216 which is shown schematically only. FIG. 4A only shows pipe 216 which provides back-pulsing gas to the filter modules of the stacks 204 for regeneration of the same. A corresponding pipe is needed (not shown) for regeneration of the stacks 206.

Extending from the back-pulsing gas pipe 260 a plurality of back pulse supply tubes 264 direct the blow-back gas to the various filter module stacks 204, 204', 204", . . . .

The back-pulsing pressure supplied via the clean gas discharge channel into the individual filter modules 204a, 204b, 204c, 204d and 206a, 206b, 206c, 206d detaches particulate matter which has been collected during the filtration operation from the filter elements of these filter modules.

The particulate matter discharged during back-pulsing from the catalytic filter modules is collected in conically shaped dust collectors 220 arranged at the bottom of housing 202.

In case the catalytic removal of components of the raw gas requires a reactant and/or if a sorbent is needed for completing the filtration, the raw gas supply channel may be provided with a sorbent and/or reactant injection unit 222.

Figure 5A:
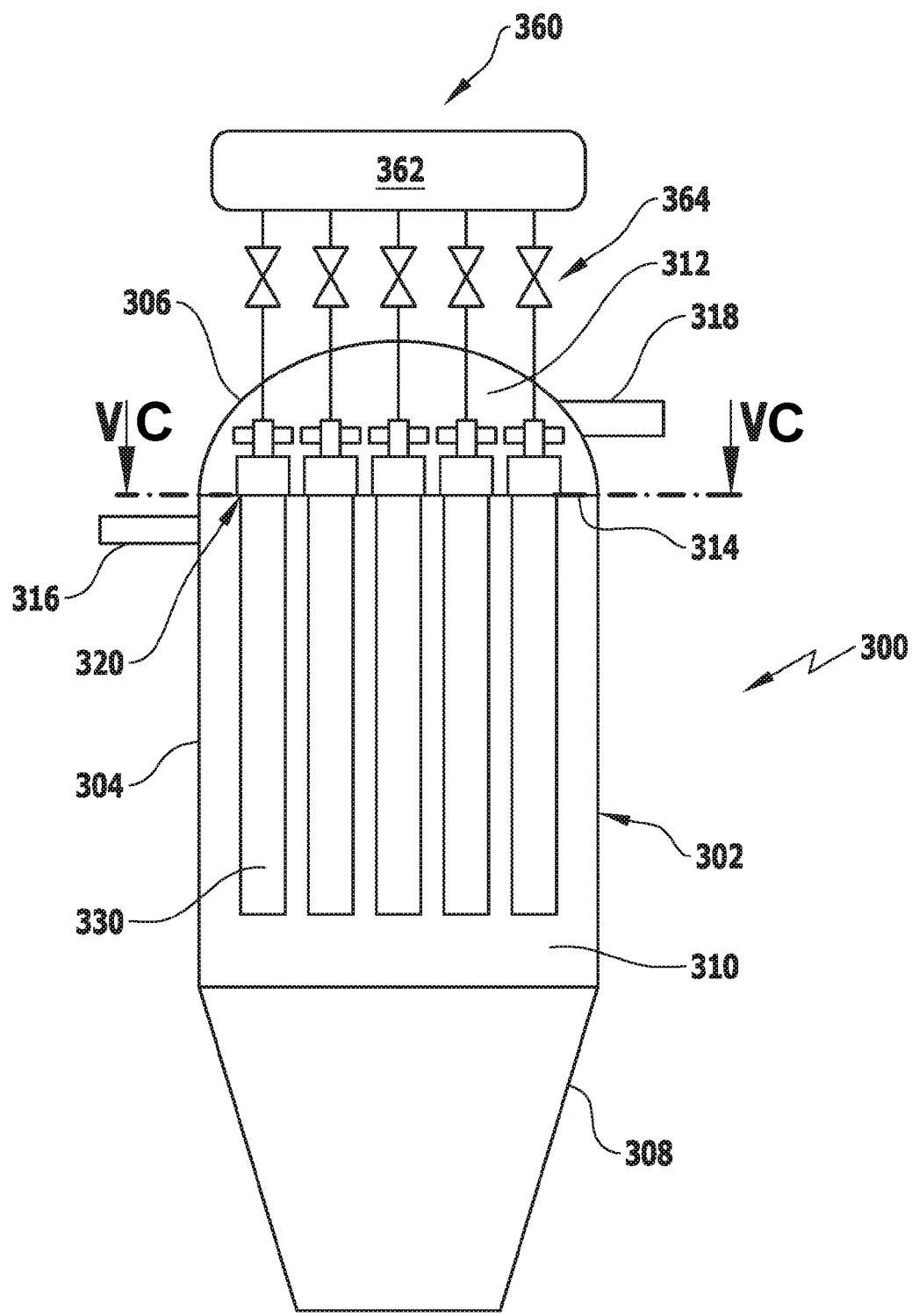

In FIG. 5A, a second embodiment of an inventive catalytic filter system 300 is shown comprising a housing 302 which essentially consist of a cylindrical wall portion 304 which is closed at its upper end by a dome-shaped cover 306 and connected at its lower end to a dust collector 308 with a conical shape.

The housing 302 is divided into a raw gas chamber 310 and a clean gas chamber 312 by a tube sheet 314 which spans across the whole cross-section of the cylindrical wall portion 304 at its upper end.

The raw gas chamber 310 is accessible via a feed gas inlet 316 through which raw gas can be introduced into the raw gas chamber 310.

The dome-shaped portion 306 of the housing 302 comprises a clean gas outlet 318 through which clean gas may be discharged.

The tube sheet 314 comprises a plurality of rectangular openings 320 which accommodate a plurality of candle-type catalytic filter modules 330 according to the present invention.

The candle-shaped catalytic filter modules 320 are shown in some more detail in FIG. 5B and comprise at their upper end and outwardly extending circumferential flange 332 which serves for mounting the catalytic filter modules 330 within the openings 320 of the tube sheet 314 in a downwardly pending manner.

FIG. 5C shows a cross-section of the system 300 along line VC-VC in FIG. 5A.

The individual catalytic filter modules 330 comprise five units 334, 335, 336, 337 and 338 stacked on top of one another, all facing with their feed face or upstream side to the right as shown in FIG. 5B. The units 334 to 338 have about the same configuration with raw gas ducts and filtrate ducts alternatingly arranged in a checkerboard manner as shown in FIG. 1A so that a more detailed explanation in that respect is omitted here. The block-shaped units 334 to 338 may be assembled in a common frame structure 352 holding the units together and providing a common clean gas channel 346. The top surface of the common frame structure 352 may integrally incorporate the flange 332 and provide the opening 350.

On the opposite face, the block-shaped units 334 to 338 are covered by a common catalytic element 340.

At the downstream or discharge side 342 of the common catalytic element 340 a common clean gas collecting and discharge arrangement 344 is provided which essentially consists of one clean gas channel 346 which at its upper end 348 discharges clean gas through opening 350 into the clean gas chamber 312 of housing 302. Similar to what has been shown in FIG. 1B and described in the context therewith the filter modules 330 may be provided with disc-shaped safety fuse elements extending across the whole discharge side surface of the filter module (not shown in FIGS. 5A to 5C).

The candle-type filter modules 330 are arranged in the tube sheet 314 in a parallel, staggered arrangement where the upstream or feed sides of the individual filter modules 330 face the back side clean gas channels of neighboring filter modules 330.

For regeneration of the catalytic filter modules 330 of the catalytic filter system 300 a back-pulsing system 360 is provided comprising a pressure source 362 as well as a plurality of supply lines 364 which end within the dome-shaped cover 306 above the individual filter modules 330.

The particulate matter which is detached from the raw gas ducts of the block-shaped units 334, 335, 336, 337, 338 of the catalytic filter modules 330 is collected by gravity within the dust collecting cone-shaped housing portion 308.

Upon back-pulsing, when particulate matter is detached from the raw gas ducts of the block-shaped units 334, 335, 336, 337, 338 of the filter modules 330, no cross-contamination between neighboring filter modules 330 can occur because of their parallel orientation described above.

The advantages of the present invention shall be explained in some more detail by way of an exemplary design.

The system 200 of FIGS. 4A to 4C with catalytic filter modules 204, 206 may be designed for the handling of a flue gas volume rate of 234,000 standard cubic meter per hour for removal of particulate matter and nitrogen oxides as follows:

The filter modules 204, 206 each have a feed side area of 1500×1000 mm². The filter elements were of a honeycomb structure with square cross-sections of the raw gas and filtrate ducts of 10 mm×10 mm size, the axial length of the raw gas and filtrate ducts being 140 mm. The filter element of each module is composed of 24 units with a feed face area of 250 mm×250 mm in 6×4 arrangement.

The filter modules are equipped with plate-shaped catalytic elements of a thickness of 200 mm in flow direction of a ceramic SiC foam with a pore density of 30 ppi (pores per inch) which is catalytically activated with an SCR catalyst of the composition $TiO_2$, $V_2O_5$, $WO_3$.

At an atmospheric pressure and an operating temperature of about 300° C., 192 filter modules are needed to cope with the above identified volume rate.

Figure 4B:
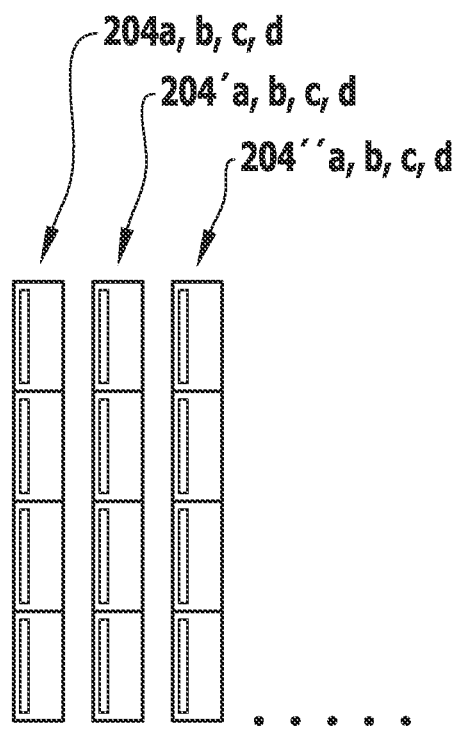
Figure 4C:
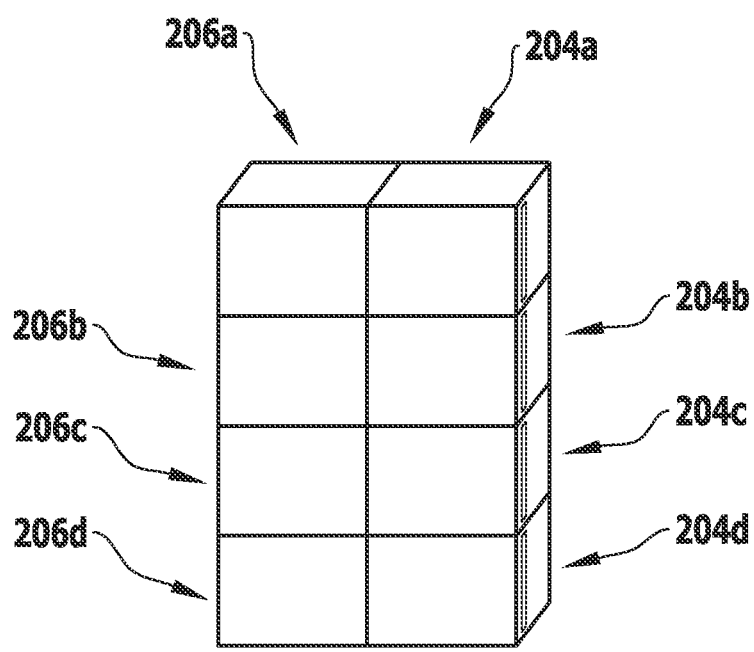

The size of a housing 202 to accommodate the 192 filter modules in stacks of four modules 204, 206 as shown in FIGS. 4A to 4C would have the dimensions of 3.5 m width, 12.5 m length and a height of 4 m. The filter modules may be incorporated in the housing with a distance from stack to stack in the longitudinal direction of the housing of 100 mm.

In cases where the operating pressure is about 1 bar or more above the ambient pressure it is preferred to use the vessel-type housings 302 shown for the embodiment of FIG. 5A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A catalytic filter module for gaseous fluids comprising a first set of a block-shaped filter element and a catalytic element having an upstream face and on its opposite side a clean gas face, and a second set of a block-shaped filter element and a catalytic element having an upstream face and on its opposite side a clean gas face, the first and second sets being arranged spaced apart from one another and oriented back-to-back with the clean gas faces of the respective catalytic elements;

and a clean gas collecting and discharge arrangement, wherein the first set catalytic element is substantially coextensive with the respective first set filter element, and the second set catalytic element is substantially coextensive with the respective second set filter element;

the first set filter element and the second set filter element each having a feed face and on its opposite side a discharge face from which filtrate exits to be received by the upstream face of the respective catalytic element, the gaseous fluid exiting the respective catalytic element as clean gas at the clean gas face thereof opposite to the upstream face, and wherein said clean gas collecting and discharge arrangement comprises a channel extending across all of the clean gas faces of the catalytic elements deflecting and directing clean gas flow transverse to a vertical of the clean gas faces of the catalytic elements to a clean gas discharge opening of the filter module at a side face thereof, said clean gas collecting and discharge arrangement being designed as a common arrangement for the first set and the second set and positioned in between the first and second sets receiving clean gas from the clean gas faces of the catalytic elements of the first and second sets.

2. The catalytic filter module according to claim 1, wherein said catalytic element is a compartment accommodating a fluidized bed or fixed bed of catalytic particles.

3. The catalytic filter module according to claim 1, wherein said catalytic element is a porous body of a fibrous and/or foam material comprising a catalyst, the catalyst being optionally applied to the body of the catalytic element by coating or impregnating same.

4. The catalytic filter module according to claim 3, wherein the catalytic element and the filter element have have a pore size, and the pore size of the catalytic element is larger than the pore size of the filter element.

5. The catalytic filter module according to claim 1, wherein the catalytic element is a redox catalytic element, a catalytic element for NO reduction and/or a catalytic element for tar removal.

6. The catalytic filter module of claim 1, wherein the catalytic element comprises on its upstream face a filter layer to provide a safety fuse functionality to the catalytic element.

7. The catalytic filter module of claim 1, wherein the channel of the clean gas collecting and discharge arrangement has a height, measured as the clearance in the direction of the vertical of the clean gas face of the catalytic element, in the range of from about 0.1 to about 0.7 times a distance of the feed face of the filter element from the clean gas face of the catalytic element.

8. The filter module according to claim 1, wherein the channel of the clean gas collecting and discharge arrangement is oriented with its longitudinal direction at an angle of about 30° or more to the clean gas face of the catalytic element of the filter module.

9. The catalytic filter module according to claim 1, wherein said filter element comprises a honey-comb structure, comprising a plurality of raw gas ducts and filtrate ducts, the raw gas ducts being separated from the filtrate ducts by tubular wall parts, the raw gas ducts being open at the feed face of the filter element and closed at the discharge face thereof, said filtrate ducts being closed at the feed face of the filter element and open at the discharge face thereof.

10. The filter module according to claim 9, wherein the cross section of the tubular wall parts of the filter elements is of a polygonal shape.

11. The filter module according to claim 10, wherein the tubular wall parts have a cross-sectional area corresponding to the area of a square with an edge length of about 3 to about 20 mm.

12. The filter module according to claim 10, wherein the length of the tubular wall parts of the filter elements amounts to about 300 mm or less.

13. The catalytic filter module of claim 9, wherein said raw gas ducts and filtrate ducts are oriented parallel or slanted at an angle of from about 10° to about 60° to the vertical of the feed face of the filter element.

14. The catalytic filter module of claim 1, wherein the channel of the clean gas collecting and discharge arrangement has a height, measured as the clearance in the direction of the vertical of the clean gas faces of the sets, in the range of from about 0.2 to about 1.4 times the distance of the feed face of the filter element from the clean gas face of the catalytic element of one set.

15. A catalytic filter system comprising a filter housing and two or more catalytic filter modules for gaseous fluids, the two or more filter modules each comprising a first set of a block-shaped filter element and a catalytic element having an upstream face and on its opposite side a clean gas face, and
 a second set of a block-shaped filter element and a catalytic element having an upstream face and on its opposite side a clean gas face, the first and second sets being arranged spaced apart from one another and oriented back-to-back with the clean gas faces of the respective catalytic elements; and
 a clean gas collecting and discharge arrangement,
 wherein the first set catalytic element is substantially coextensive with the respective first set filter element, and the second set catalytic element is substantially coextensive with the respective second set filter filter element;
 the first set filter element and the second set filter element each having a feed face and on its opposite side a discharge face from which filtrate exits to be received by the upstream face of the respective catalytic element, the gaseous fluid exiting the respective catalytic element as clean gas at the clean gas face thereof opposite to the upstream face,
 and wherein said clean gas collecting and discharge arrangement comprises a channel extending across all of the clean gas faces of the catalytic elements deflecting and directing clean gas flow transverse to a vertical of the clean gas faces of the catalytic elements to a clean gas discharge opening of the filter module at a side face thereof,
 said clean gas collecting and discharge arrangement being designed as a common arrangement for the first set and the second set and positioned in between the first and second sets receiving clean gas from the clean gas faces of the catalytic elements of the first and second sets;
 wherein the two or more filter modules are accommodated in said housing, said housing comprising an interior space separated into a raw gas and a clean gas chamber, said filter module(s) being arranged within said interior space, the feed side(s) of the filter element(s) oriented substantially vertical, said feed side(s) of the filter element(s) being in fluid communication with the raw gas chamber and said clean gas discharge opening(s) of the filter module(s) being in fluid communication with the clean gas chamber of the housing.

16. The catalytic filter system of claim 15, wherein the housing comprises a tube sheet separating the interior of the housing into the raw gas and clean gas chamber, said tube sheet comprising openings accommodating the two or more filter modules.

17. The catalytic filter system of claim 15, wherein the two or more filter modules are accommodated in the housing with a parallel orientation of the feed sides.

18. The catalytic filter system of claim 17, comprising more than two filter modules, wherein the more than two filter modules are arranged in a staggered configuration.

19. The catalytic filter system according to claim 15, wherein the two or more filter modules are mounted in a common rack.

20. The catalytic filter system of claim 19, wherein the system comprises a clean gas discharge passage in communication with the clean gas discharge openings of the two or more filter modules.

21. The catalytic filter system of claim 15, wherein the two or more filter modules are in parallel orientation to one another.

22. A catalytic filter system comprising a filter housing and two or more catalytic filter modules for gaseous fluids, the two or more filter modules each comprising a block-shaped filter element, a catalytic element having an upstream face and on its opposite side a clean gas face and a clean gas collecting and discharge arrangement,
 wherein said catalytic element is substantially coextensive with the filter element,
 said filter element having a feed face and on its opposite side a discharge face from which filtrate exits to be received by the upstream face of the catalytic element, the gaseous fluid exiting the catalytic element as clean gas at the clean gas face thereof opposite to the upstream face,
 and wherein said clean gas collecting and discharge arrangement comprises a channel extending across all of the clean gas face of the catalytic element deflecting and directing clean gas flow transverse to a vertical of the clean gas face of the catalytic element to a clean gas discharge opening of the filter module at a side face thereof, the housing comprising an interior space separated into a raw gas and a clean gas chamber, wherein the two or more filter modules are accommodated in the housing, the filter module(s) being arranged within said interior space, with a parallel orientation of their feed sides, the feed side of one module facing the feed side of an adjacent module, the feed side(s) of the filter element(s) oriented substantially vertical, said feed side(s) of the filter element(s) being in fluid communication with the raw gas chamber and said clean gas discharge opening(s) of the filter module(s) being in fluid communication with the clean gas chamber of the housing.

23. The catalytic filter system of claim 22, wherein the system further includes partition plates positioned in between two adjacent filter modules.

24. A catalytic filter system comprising a filter housing and two or more catalytic filter modules for gaseous fluids, the two or more filter modules each comprising a block-shaped filter element, a catalytic element having an upstream face and on its opposite side a clean gas face and a clean gas collecting and discharge arrangement, wherein said catalytic element is substantially coextensive with the filter element, said filter element having a feed face and on its opposite side a discharge face from which filtrate exits to be received by the upstream face of the catalytic element, the gaseous fluid exiting the catalytic element as clean gas at the clean gas face thereof opposite to the upstream face, and wherein said clean gas collecting and discharge arrangement comprises a channel extending across all of the clean gas face of the catalytic element deflecting and directing clean gas flow transverse to a vertical of the clean gas face of the catalytic element to a clean gas discharge opening of the filter module at a side face thereof, wherein the two or more filter modules are accommodated in said housing, said housing comprising an interior space separated into a raw gas and a clean gas chamber, said filter module(s) being arranged within said interior space, and accommodated in the housing with a parallel orientation of the feed sides, the feed side of one filter module facing the clean gas side of an adjacent module, the feed side(s) of the filter element(s) oriented substantially vertical, said feed side(s) of the filter element(s) being in fluid communication with the raw gas chamber and said clean gas discharge opening(s) of the filter module(s) being in fluid communication with the clean gas chamber of the housing.

25. A catalytic filter module for gaseous fluids comprising a block-shaped filter element comprising a honey-comb structure, comprising a plurality of raw gas ducts and filtrate ducts, the raw gas ducts being separated from the filtrate ducts by tubular wall parts, the tubular wall parts each having a cross section having a polygonal shape and a length of about 300 mm or less, the raw gas ducts being open at the feed face of the filter element and closed at the discharge face thereof, said filtrate ducts being closed at the feed face of the filter element and open at the discharge face thereof;

a catalytic element having an upstream face and on its opposite side a clean gas face; and a clean gas collecting and discharge arrangement, wherein said catalytic element is substantially coextensive with the filter element, said filter element having a feed face and on its opposite side a discharge face from which filtrate exits to be received by the upstream face of the catalytic element, the gaseous fluid exiting the catalytic element as clean gas at the clean gas face thereof opposite to the upstream face, and wherein said clean gas collecting and discharge arrangement comprises a channel extending across all of the clean gas face of the catalytic element deflecting and directing clean gas flow transverse to a vertical of the clean gas face of the catalytic element to a clean gas discharge opening of the filter module at a side face thereof, wherein the channel of the clean gas collecting and discharge arrangement has a height, measured as the clearance in the direction of the vertical of the clean gas face of the catalytic element, in the range of from about 0.3 to about 0.5 times a distance of the feed face of the filter element from the clean gas face of the catalytic element.

* * * * *